United States Patent [19]
Visel et al.

[11] Patent Number: 5,723,531
[45] Date of Patent: Mar. 3, 1998

US005723531A

[54] RUBBER COMPOSITION AND TIRE HAVING TREAD THEREOF

[75] Inventors: Friedrich Visel, Bofferdange, Luxembourg; Thierry Florent Edme Materne, Attert, Belgium; Uwe Ernst Frank, Marpingen, Germany; Rene Jean Zimmer, Howald, Luxembourg

[73] Assignee: The Goodyear Tire & Rubber Company, Akron, Ohio

[21] Appl. No.: 846,911

[22] Filed: Apr. 30, 1997

[51] Int. Cl.$^6$ ..................................... C08K 3/00
[52] U.S. Cl. .................. 524/496; 524/137; 524/207; 524/495
[58] Field of Search ................... 524/495, 496, 524/137, 207

[56] References Cited

U.S. PATENT DOCUMENTS

| | | | |
|---|---|---|---|
| 4,386,185 | 5/1983 | Macdonnell et al. | 524/566 |
| 4,721,740 | 1/1988 | Takeshita et al. | 523/215 |
| 4,820,751 | 4/1989 | Takeshita et al. | 523/215 |

*Primary Examiner*—Edward J. Cain
*Attorney, Agent, or Firm*—Henry C. Young, Jr.

[57] ABSTRACT

A rubber composition comprised of elastomer(s), carbon black reinforcement and coupling agents. In one aspect, a modified carbon black may be used.

A tire having a component of such rubber composition such as, for example, a tread, is also provided.

84 Claims, No Drawings

5,723,531

RUBBER COMPOSITION AND TIRE HAVING TREAD THEREOF

FIELD

This invention relates to a rubber composition composed of at least one elastomer and carbon black reinforcement therefor. The invention also relates to a tire having a component thereof such as, for example, a tread.

BACKGROUND

Tires are typically prepared of treads of elastomer based rubber compositions which are conventionally carbon black reinforced. Sometimes tire tread rubber compositions may also be silica reinforced or at least contain a significant amount of silica reinforcement.

Often coupling agents are used with precipitated silica to assist in its reinforcement of elastomers with which the silica is mixed. Utilization of silica couplers for such purpose is well known to those skilled in such art.

It is important to appreciate that classical reinforcing carbon blacks normally contain various substituents on their surfaces, to a varying extent. Representative of such substituents are, for example carboxyl groups (—COOH), hydroxyl groups (—OH) and phenolic groups (—$C_6H_4$OH). The presence, distribution and amounts, or concentration, of each of such substituents are determined in large measure upon the method and conditions used for the manufacture of the carbon blacks, whether they be furnace or channel blacks. The presence, distribution and concentration of such substituents on the surface of reinforcing carbon blacks are well known to those having skill in such art.

In one aspect of this invention, it is desired to provide a rubber composition composed of diene-based elastomer(s) which contains a combination of reinforcing carbon blacks having one or more of such substituents on their surfaces and coupling agents to aid in coupling such carbon blacks to such elastomer(s).

In another aspect of this invention, it is desired to provide such rubber composition in which the carbon black is either a classical carbon black or a modified classical carbon black.

Classical rubber-reinforcing carbon blacks considered for use in this invention are, for example, carbon blacks having an Iodine Adsorption Number (ASTM test D1510) in a range of about 30 to about 180 and sometimes even up to about 250, or Nitrogen Adsorption Number (ASTM D3037), which might sometimes be referred to as a Nitrogen Specific Surface Area ($N_2$SA), in a range of about 30 to about 180 and even up to about 250, and a DBP (dibutylphthalate) Adsorption Number (ASTM test D2414) in a range of about 20 to about 150. Representative examples of such carbon blacks, and references to associated ASTM test methods, may be found, for example, in *The Vanderbilt Rubber Handbook*, 1990 edition on pages 416 to 418.

Also, rubber compositions for tires have been suggested which contain (i) a modified carbon black reinforcement having acidic group(s) introduced onto its surface in an amount of about 0.25 to about 2.0 ueq/m$^2$ (micro equivalents/m$^2$) thereof together with (ii) a specified silane coupling agent. For example, see U.S Pat. No. 4,820,751.

It is desired herein to provide a rubber composition for tire treads which utilizes a (i) a novel combination of classical carbon and coupling agents or (ii) a modified carbon black with suitable coupling agents, particularly for use as a tire component such as a tire tread.

The term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which is comprised of (A) 100 parts by weight of at least one diene-based elastomer selected from homopolymers of conjugated dienes, copolymers of conjugated dienes and copolymers of conjugated dienes with vinyl aromatic compounds such as styrene and alpha-methystyrene;

(B) about 30 to about 110, alternatively about 30 to about 90, phr of reinforcing carbon black selected from at least one of:

(1) classical carbon black having a concentration of acidic groups on its surface in a range of about 0.1 to about 2.0 ueq/m$^2$ (micro equivalents/m$^2$) wherein said acidic groups are comprised of at least one of carboxyl and hydroxyl groups; and wherein said classical carbon black has a Nitrogen Specific Surface Area ($N_2$SA) in a range of about 30 to about 250, alternatively about 50 to about 180, g/m$^2$ and a corresponding DBP Adsorption Number in range of about 20 to about 150, alternatively about 50 to about 130 cm$^3$/100 g;

(2) alkoxy silane modified reinforcing carbon black having polysiloxane groups on the surface thereof, said polysiloxane groups containing silanol groups thereon; said carbon black having been prepared by treating carbon black with an alkoxysilane having the general formula (R'O)$_{4-x-y}$Si(R)$_x$(OH)$_y$, including R$_n$(R'O)$_m$Si and/or (R'O)$_n$Si(OH)$_m$ where R and R' are individually selected from the group consisting of primary, secondary and tertiary alkyl radicals and aralkyl radicals where R has from 1 to 20 carbon atoms and R' has from 1 to 3 carbon atoms; n and m are whole integers from 1 to 3 such that the sum of n and m is 4, x is zero or an integer from 1 to 4 and y is zero or an integer of from 1 to 4; and (3) a modified classical carbon black having been modified by being partially oxidized to increase its concentration of acidic groups on its surface by at least 30 percent, and preferably at least 50 percent, to a concentration in a range of about 0.2 to about 5.0 ueq/m$^2$; wherein said acidic groups are comprised of at least one of carboxyl and hydroxyl groups; and wherein said modified classical carbon black has a Nitrogen Specific Surface Area ($N_2$SA) in a range of about 30 to about 250, alternatively about 50 to about 180, m$^2$/g and a corresponding DBP Adsorption Number in range of about 20 to about 150, alternatively about 50 to about 130 cm$^3$/100 g; and (C) at least one coupling agent selected from (1) molecules having a moiety reactive with said carboxyl and hydroxyl groups on the surface of said classical carbon and said partially oxidized classical carbon black with the aforesaid concentration of acidic group(s) on the surface thereof within an overall range of about 0.1 to about 5.0 ueq/m², and another moiety interactive with the diene-based elastomer(s); and (2) molecules having a moiety reactive with silanol groups on carbon black surfaces in the case of alkoxysilane treated carbon blacks, and another moiety interactive with the diene-based elastomer(s).

In the description of the "acid" groups on the surface of the classical and partially oxidized carbon blacks, various groups are described. It is recognized that all of such groups may not be present in a given carbon black, however, it is considered herein for the purposes of this invention that at least the hydroxyl and carboxyl groups are normally present.

In practice, for said partially oxidized carbon black, typical acidic groups are considered herein to be comprised of at least one of carboxyl (—COOH) and hydroxy (—OH) groups, although other acidic may also be present.

In one aspect of the invention, the rubber composition may also contain about five to about 100, or an intermediate range of about 10 to about 100, about 30 to about 90 or even about 5 to about 20, phr of precipitated silica reinforcement which contains silanol groups on the surface thereof, wherein the total of said carbon black, including modified carbon black, for this invention and said precipitated silica is within a range of about 40 to about 110 phr.

A significant aspect of this invention is the use of specified couplers, which may be referred to, for example, as coupling agents, to aid in coupling the various carbon blacks to the diene-based elastomer(s).

In further practice of this invention, a tire is provided having a tread of the rubber composition of this invention, namely diene-based elastomer(s), at least one of said carbon blacks, optionally precipitated silica, and at least one of said specified couplers. It is also contemplated that other components of a tire may be of such rubber composition. Such other tire components may include, for example, wire coat, sidewall and chafer, although other tire components might also be composed of the rubber composition.

In such endeavor, the selection of coupling agents is dependant, is some respects, upon the nature and perhaps even the concentration of the substituents on the carbon black surface.

For example, and in the practice of this invention, for the aforesaid (1) classical carbon blacks (2) alkoxysilane modified carbon blacks and (3) partially oxidized carbon blacks, representative examples of contemplated coupling agents are those having the following formula(s):

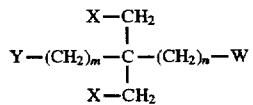
(I)

wherein X is a radical selected from at least one of hydroxyl, amine and carboxyl radicals, preferably an hydroxyl radical; Y is a radical selected from hydroxyl and hydrogen radicals; W is a radical selected from hydroxyl, thiol, cyanide, epoxide, allyl, vinyl, dithiocarbamate and benzothiazole radicals; m is zero or one and n is an integer of 1 to 6 inclusive;

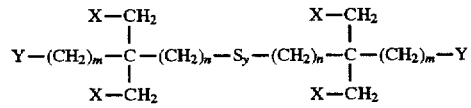
(II)

wherein X is a radical selected from at least one of hydroxyl, amine and carboxyl radicals, preferably an hydroxyl radical;

Y is a radical selected from hydroxyl or hydrogen radicals; m is zero or one; n is an integer of 1, 2 or 3 and y is an integer of 1 to 6 inclusive, provided however that where y is 1 or 2, then at least an amount of free sulfur equivalent to the amount of sulfur contained in the formula (II) is added to the rubber composition;

(III)

where X is a radical selected from hydroxyl, amine and carboxyl radicals; W is a radical selected from hydroxyl, thiol, cyanide, epoxide, allyl, vinyl, dithiocarbamate and benzothiazole radicals; a is an integer of 1 to 4 inclusive; and c is zero or an integer of from 1 to 3 inclusive;

(IV)

wherein X is a radical selected from hydroxyl, amine and carboxyl radicals, preferably an hydroxyl radical; a is an integer of 1 to 3 inclusive; c is zero or an integer of from 1 to 3 inclusive; and y is an integer of 1 to 6 inclusive, provided however that where y is 1 or 2, then at least an amount of free sulfur equivalent to the amount of sulfur contained in the formula (IV) is added to the rubber composition;

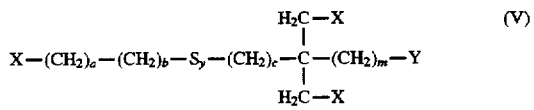
(V)

wherein X is a radical selected from hydroxyl, amine and carboxyl radicals, preferably an hydroxyl radical;

Y is a radical selected from hydroxyl or hydrogen radicals; a is an integer from 1 to 5 inclusive; c is zero or an integer from 1 to 3 inclusive and y is an integer of 1 to 6 inclusive, provided however that where y is 1 or 2, then at least an amount of free sulfur equivalent to the amount of sulfur contained in the formula (V) is added to the rubber composition;

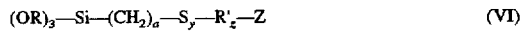
(VI)

wherein R is an alkyl radical selected from methyl, ethyl and propyl, preferably from methyl and ethyl, radicals; z is zero or one and y is an integer of 1 to 6 inclusive, provided however that where y is 1 or 2, then at least an amount of free sulfur equivalent to the amount of sulfur contained in the formula (V) is added to the rubber composition, and R' is an alkylene radical containing from 1 to 15, preferably from 1 to 4, carbon atoms such as, for example methylene, ethylene and propylene radicals, preferably a methylene radical; and Z is the following radical:

(VI-A)

(VI-B)

wherein R is an alkyl radical selected from at least one of methyl, ethyl, propyl and butyl, preferably ethyl and butyl radicals. The P is phosphorus and the S is sulfur as are conventionally represented.

In the above recitation of substituents, the said hydroxyl, hydrogen, thiol, thiocyanate, cyanide, allyl and vinyl radicals are as conventionally considered as being represented as —OH, —H, —SH, —SCN, —CN, $CH_2$=CH—$CH_2$— and $CH_2$=CH— and the thiocarbamate and benzothiazole radicals are considered herein as being conventionally represented. While y is represented as being an integer of from 1 to about 6 inclusive, in practice y may sometimes preferably be an average of from about 2 to about 4 or from about 2.5 to about 5.5.

For the said coupler Formulas II, IV, V and VI it is recited that where y is 1 or 2, then at least an amount of free sulfur equivalent to the sulfur contained in the respective Formula is added to the rubber composition. This is to a part of the coupler in such case in a sense that it is to serve to enhance the coupler's ability to interact with the diene-based elastomer(s) in the rubber composition. Conventionally such free sulfur is in addition to sulfur used, or added, as the rubber composition's vulcanization system, or package. While such additional free sulfur may be added in either the non-productive mixing stage together with the coupler, it may be alternatively added in the final, productive mixing stage for the rubber composition together with the sulfur curatives and after the coupler has been added on the prior non-productive mixing stage for the rubber composition.

Representative examples of materials represented by Formula (I) may be, for example:

(1) where X, W and Y are hydroxyl radicals, m is zero and n is 2, a material such as 1,1-di(hydroxymethyl)-1,3-propane diol, which might be represented as:

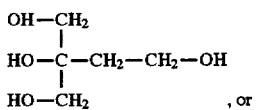
, or (2) where X, W and Y are hydroxyl radicals, m is one and n is 2 a material such as 3,3,3-tri (hydroxymethyl)-1-propanol which may be represented as:

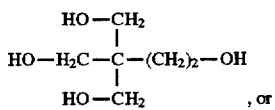
, or (3) where X and W are hydroxyl radicals and Y is a hydrogen radical, m is zero and n is two a material such as 3,3-di (hydroxymethyl)-1-propanol which may be represented as:

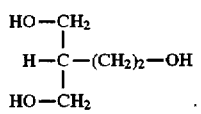

For example, the 3,3,3-tri (hydroxymethyl)-1-propanol might be synthesized by reacting formaldehyde with 3-chlorine-1-propanal and hydrolyzing the product in an alkaline (NaOH) solution.

Representative examples of materials represented by Formula (II) are, for example, (1) where X and Y are hydroxyl radicals and m is zero, n is 2 and y is 2, a material as 2-(3-{[3,4-dihydroxy-3-(hydroxymethyl)butyl] disulfanyl} ethyl)-1,2,3 propane triol which might be represented as:

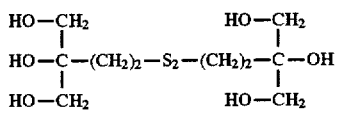

(2) where X is an hydroxyl radical and Y is a hydrogen radical and m is zero, n is two and y is 2, a material as 2-(2-{[4'-hydroxy-3-(hydroxymethyl)butyl] disulfanyl}ethyl)-1,3-propane diol which might be represented as:

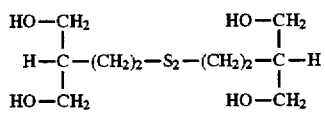

(3) where X and Y are hydroxyl radicals, m is one, n is 2 and y is 2, a material as 2-(2{4-hydroxy-3,3-di (hydroxymethyl)butyl]disulfanyl}ethyl)-2-(hydroxymethyl)-1,3-propane diol which might be represented as:

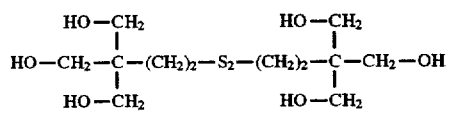

Such material might be synthesized by, for example, reacting 3,3,3 tri (hydroxymethyl)-1-chlorine-propane with sodium disulfide.

A representative example of material represented by Formula (III), where X and W are hydroxyl radicals and where a is 4 and b is zero is, for example: 1,4-butane diol, which may be represented as: HO—$CH_2$—$CH_2$—$CH_2$—$CH_2$—OH.

A representative example of material represented by Formula (IV) where a is 2, c is 2 and y is 2, may be bis-(1-hydroxy-2-sulfanyl-ethane), which might be represented as: HO—$CH_2$—$CH_2$—S—S—$CH_2$—$CH_2$—OH.

Such material may be synthesized, for example, by reacting HO—$CH_2$—$CH_2$—X with $Na_2S_2$, where X in this case is a halogen such as chlorine.

A representative example of material represented by Formula (V) may be for example, where X and Y are hydroxyl radicals, m is 1, c is 2, y is 2, a is 1 and b is 2, may be 2-[2-[(2-hydroxyethyl) disulfanyl]ethyl}-2-(hydroxymethyl)-1,3-propane diol, which may be represented as:

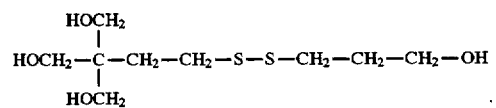

Such material might be synthesized, for example, by reacting the following two chlorides with $Na_2S_2$,

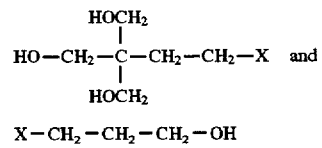

where in this case X is a halogen radical such as chlorine.

Representative examples of materials represented by Formula (VI-A), where R is an ethyl radical, z is zero, a is 3, y is 4 and Z is

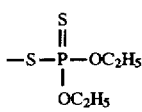

as a material such as diethyl {4'-[1,1,1 triethoxysilyl)propyl] tetrasulfanyl} thiophosphate, which might be represented as:

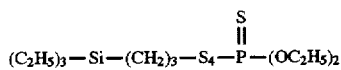

Representative examples of materials represented by Formula (VI-B), where R is an ethyl radical, a is 3, y is 4; as a material such as (tri-ethoxysilyl-propyl) tetra sulfanylphosphate, which might be represented as:

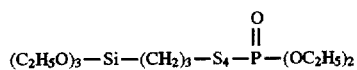

Such material might be prepared, for example, by reacting $(C_2H_5O)_3$—Si $(CH_2)_3$—S—Na together with

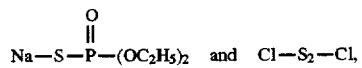

As hereinbefore pointed out, one important feature of this invention is the use of alkoxysilane modified, or treated, carbon blacks in a rubber composition together with a suitable coupling agent.

Significantly, it is considered herein that such treated carbon blacks contain polysiloxane groups on the surface of the treated carbon blacks which, in turn, contain silanols (SiOH radicals, or groups) which are available for further chemical reactions.

As also hereinbefore pointed out, another important feature of this invention is the use of partially oxidized carbon blacks in a rubber composition together with a suitable coupling agent.

Significantly, it is considered herein that such partially oxidized carbon blacks contain hydroxyl, and/or carboxyl groups on the surface of the treated carbon blacks which are available for further chemical reactions, particularly with the couplers recited herein.

For the alkoxy silane modified carbon black, various of the aforesaid alkoxysilanes may be used for modification of the carbon black, for example by heating the materials in the presence of nitrogen to an elevated temperature such as at least about 400° C.

Representative of the R radical for the alkyl substituents for the alkoxysilanes are alkyl radicals containing from 1 to 20, where, alternatively, at least one of such R alkyl radicals contains from 6 to 20, carbon atoms such as, for example hexyl, octyl, n-octadecyl, and n-hexadecyl radicals.

Thus, in an alternative mode, the R radicals are selected from alkyl radicals containing from 1 to 20 carbon atoms wherein at least one R radical contains from 6 to 20 carbon atoms where the remainder of the R radicals, if any, are alkyl radicals containing from 1 to 3 carbon atoms inclusive.

Representative of the R' radical for the alkyl substituents for the alkoxysilanes are alkyl radicals containing from 1 to 5, preferably 1 to 3 inclusive as hereinbefore recited, carbon atoms such as, for example methyl, ethyl, propyl and iso-propyl radicals. Preferably, the R' radical is selected from methyl and ethyl radicals.

Therefore, in an alternative mode, at least one of the R radicals is larger, and preferably substantially larger, in terms of carbon atoms, than the R' radicals.

Representative examples of alkoxysilanes having the formula $R_n(R'O)_mSi$ are, for example n-octyl triethoxysilane, n-hexadecyl triethoxysilane, dimethyl diethoxysilane, n-octadecyl trimethoxysilane, n-octadecyl triethoxysilane, methyl n-octyl diethoxysilane, dimethoxy-dipropyl-silane and tetroethoxysilane.

Representative examples of alkoxysilanes having general formula $(R'O)_nSi(OH)_m$ are, for example trimethoxysilanole $(MeO)_3$—Si—OH, tributoxysilanole $(BuO_3)$—Si—OH, and triphenoxysilanole $(PhO)_3$—Si—OH.

Representative examples of alkoxysilanes having general formula $R_n(R'O)_mSi$ is, for example, $(MeO)_2Si$—$(C_3H_7)_2$.

A partially oxidized carbon black for use in this invention may be prepared, for example, by treating (oxidizing) a carbon black with hydrogen peroxide and/or ozone. For example, the carbon black might be oxidized with hydrogen peroxide by adding about 2 to 3 g of hydrogen peroxide to a mixture of 100 g of carbon black in a liter of water, heating the mixture to a temperature of about 50° C. to about 80° C. for about 30 minutes followed by filtering and drying the treated carbon black at an elevated temperature such as about 120° C. for a period of time such as, for example, about 6 hours. By varying the amount of hydrogen peroxide, the amount of acidity (such as, for example, the hydroxyl and/or carboxyl groups) on the carbon black surface might be varied.

As a further example, ozone may be generated and passed through particles (pigments) of carbon black contained within a cylindrical container. The degree of oxidation of the carbon black may depend somewhat upon the flow rate of the ozone and the reaction, or treatment, time and temperature.

By such process, a modified carbon black is created which contains hydroxyl and/or carboxyl groups on its surface and may also contain at least one of phenolic, keto and aldehyde moieties on its surface as hereinbefore discussed. While it is recognized that such moieties are often found on the surfaces of classical carbon black, the significance of the groups on the surface of the partially oxidized carbon black is that the hydroxyl and carboxyl groups are of a higher concentration, namely an increase of at least 30 percent, as compared to an unoxidized, classical carbon black on the surface of the modified (partially oxidized) carbon black, as referenced on pages 417–418 in the aforesaid Vanderbilt Rubber Handbook reference, for the purposes of this invention.

The total surface acidity of a classical carbon black after being submitted to an oxidation treatment, for example by the aforesaid hydrogen peroxide or ozone method, might be in a range of about 0.2 to about 4 ueq/m². Using a greater amount of hydrogen peroxide such as, for example, about 5 g instead of 1 g of hydrogen peroxide in the aforesaid hydrogen peroxide method, may provide a carbon black with a greater total amount of such acid groups on its surface might be obtained, for example, perhaps a range of about 0.4 to about 5.0 ueq/m².

It is important to appreciate that a goal of oxidizing the surface of the carbon black is to increase its reactivity (through an increase of available acid type groups on its surface) toward the coupling agents recited in this specification. This effect is considered herein to enhance the bonding of the elastomer to the treated carbon black through the coupling agent.

In practice, the total acid concentration on the surface of the carbon black may be determined, for example, by mixing 50 ml of ⅟₂₅₀N solution of sodium hydroxide with one gram of carbon black. The mixture is boiled in a flask fitted with a reflux condenser for about two hours at 100° C. Ten milliliters of the resulting supernatant liquid is titrated with ⅟₅₀₀N hydrochloric acid while also performing a blank test on the sodium hydroxide solution without the carbon black. The total acidic group (ueq/g) may be determined by taking the difference in hydrochloric acid consumption between the carbon black containing sample and the blank sample. The total acidic group per unit area (ueq/m$^2$) can be calculated with the previously measured Nitrogen Adsorption Specific Surface Area (N$_2$SA) of the test carbon black.

For the purposes of this description, the (N$_2$SA) might also be referred to as a BET surface area as measured using nitrogen gas. A BET method of measuring surface area is described, for example by Brunauer, Emmett and Teller: Journal of American Chemical Society, 60, (1938), page 309. An additional reference might be DIN method 66131.

In the practice of this invention, it is contemplated herein that the addition of a surface-modified carbon black such as an alkoxysilane, including tetraethoxysilane, modified carbon black, together with the coupling agent, to the rubber composition may result in not only improved processing characteristics for the carbon black reinforced elastomer composition such as, for example, reduced viscosity compared to a quantitatively silica reinforced rubber composition in a substantial absence of conventional carbon black reinforcement, but anticipated improvements for the sulfur cured rubber in at least one of rubber reinforcement, resistance to abrasion and improved hysteresis, the improvement of properties also being somewhat dependent upon the nature of the rubber composition itself, as compared to not using the recited coupling agents with the carbon black, particularly with the aforesaid treated carbon black. The actual results will depend upon the carbon black used, the nature of the treatment of the carbon black, the couplers used and the rubber composition itself.

In practice, it is considered herein that a practice of this invention is a significant departure from the practice of U.S. Pat. No. 4,820,751 insofar as use of a modified carbon black is concerned in combination with the coupling agents prescribed herein.

In practice, a contemplated weight ratio of coupler to the said carbon black, particularly surface-modified carbon black, and to precipitated silica, if used, may be in a range of about 0.01/1 to about 0.25/1.

The rubber composition itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, as hereinbefore pointed out, the rubber composition may be comprised of at least one diene-based elastomer, or rubber in addition to the said carbon black(s) and said coupler(s). Such elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methystyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2- content and emulsion polymerization prepared butadiene/acrylonitrile copolymers.

In one aspect, particularly for a tire tread, the rubber might be of at least two of diene based rubbers, in addition to the modified elastomer. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, and cis 1,4-polybutadiene rubber.

The vulcanized rubber composition should normally contain a sufficient amount of the said carbon black reinforcing filler(s) namely, ar least about 30, and usually at least about 40, phr to contribute toward a reasonably high modulus, high abrasion resistance and resistance to tear for the cured rubber composition. Thus the amount of said carbon black (s), as hereinbefore referenced, may be as low as about 30 parts per 100 parts rubber, but is usually preferably from about 40 to about 90 or even up to about 100 parts by weight.

Silica, particularly precipitated silica, as hereinbefore referenced, may also be used in combination with the said carbon black(s) and said coupler(s).

The commonly employed siliceous pigments used in rubber compounding applications can be used as the silica in this invention, including pyrogenic and precipitated siliceous pigments, including aluminosilicates, although precipitated silicas are usually preferred. It is intended for the practice of this invention that the term "precipitated silica", when used herein, also includes precipitated aluminosilicates as a form of precipitated silica.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram (m$^2$/g. The BET method of measuring surface area is described by Brunauer, Emmett and Teller: Journal of American Chemical Society (1938), page 309. An additional reference might be DIN method 66131.

The silica may also be typically characterized by having a DBP (dibutylphthalate) Absorption Number in a range of about 100 to about 400, and more usually about 150 to about 300 cc/100 gm.

The silica might be expected to have an average ultimate particle size, for example, in the range of 0.003 to 0.05 micron as determined by the electron microscope, although the silica particles may be even smaller, or possibly larger, in size.

The silica may sometimes be expected to have mercury porosimetry characteristics such as, for example. HgSSA in a range of about 50 to about 250 $m^2/g$, a V(Hg) in a range of about 1 to about 3.5 $cm^3/g$ and a PSD max between 10 to about 50 nm.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, BV3380GR, etc. and from Huber as Zeopol 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

It is to be appreciated that the coupler, if in a liquid form, might be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system maybe used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates.

Preferably, the primary accelerator is a sulfenamide. If a second accelerator is used, the secondary accelerator is preferably a guanidine, dithiocarbamate or thiuram compound.

The presence and relative amounts of the above ingredients, other than carbon black and coupler, are not considered to be the primary subject of this invention which is more primarily directed to the use of the recited coupling agents in combination with carbon blacks for the reinforcement of rubber compositions.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, carbon black and coupling agent if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

This Example is provided as an example of a contemplated practice of this invention.

Rubber compositions composed of diene-based elastomer (s) which contain carbon black reinforcement, together with coupling agents, may be prepared.

The rubber compositions may be prepared by first blending, to a temperature of about 170° C. in an internal mixer for a suitable period of time, (1) at least one diene based elastomer, (2) carbon blacks and modified carbon black of this invention, (3) various representative couplers of this invention, (4) rubber compounding ingredients including conventional amounts of zinc oxide, zinc stearate, and rubber processing oil, although a rubber processing open mill might also, or alternatively, be used. Thereafter, sulfur curatives can be blended with the mixture in a suitable internal rubber mixer or an open mill, to a temperature of about 120° C. for about 2 to 3 minutes which may consist of a conventional amount of sulfur and accelerator. The blends can then be cured at an elevated pressure and at a temperature of about 150° C.

For this Example, rubber reinforcement is used in a form of (A) about 30 to about 110 phr of the said classical carbon black, alkoxysilane treated carbon black and oxidized carbon black and, also (B) such carbon blacks, individually, with about 10 to about 100 phr of precipitated silica so long as the said carbon black and silica are within a range of about 40 to about 110 phr.

For this Example, three types of carbon blacks are individually used in individual rubber blends, namely, (a) a classical carbon black, such as for example N234, containing one or more of carboxyl, hydroxyl and phenolic groups on its surface, (b) a carbon black which contains polysiloxane on its surface which, in turn contains silanol groups, where such classical carbon black is prepared by treating it, for example, with a tetra-alkoxy silane and (c) a partially oxidized carbon black containing a total acid group concentration on its surface of about 2 ueq/m$^2$ on its surface.

For this Example, various coupling agents are used, individually, with the aforesaid carbon blacks to prepare the various rubber compositions. Such coupling agents include a Formula I material as 1,1-di(hydroxymethyl)-1,3-propane diol, 3,3,3-tri(hydroxymethyl)-1-propanol and 3,3-di (hydroxymethyl)-1-propanol; a Formula II material as (1) 2-(3-{[3,4-dihydroxy-3-(hydroxymethyl)butyl] disulfanyl}ethyl)-1,2,3 propane triol, (2) 2-(2-{[4'-hydroxy-3-(hydroxymethyl)butyl]disulfanyl}ethyl)-1,3-propane diol, and (3) 2-(2{4-hydroxy-3,3-di(hydroxymethyl)butyl] disulfanyl}ethyl)-2-(hydroxymethyl)-1,3-propane diol; a Formula III material as 1,4-butane diol; a Formula IV material as bis-(1-hydroxy-2-sulfanyl-ethane); a Formula V material as 2-[2-[(2-hydroxyethyl) disulfanyl]ethyl}-2-(hydroxymethyl)-1,3-propane diol; a Formula VI-A material as diethyl{4'-[1,1,1 triethoxysilyl)propyl]tetrasulfanyl} thiophosphate; and a Formula VI-B material as (triethoxysilyl-propyl) tetra sulfanylphosphate.

For this Example, a weight ratio of coupler to carbon black, and precipitated silica where used, is within a range of about 0.01/1 to about 0.25/1.

EXAMPLE II

Tires of size 195/65R15 are contemplated as being prepared having treads, individually, of rubber compositions discussed in Example I herein.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of
   (A) 100 parts by weight of at least one diene-based elastomer selected from homopolymers of conjugated dienes, copolymers of conjugated dienes and copolymers of conjugated dienes with vinyl aromatic compounds selected from at least one of styrene and alpha-methystyrene;
   (B) about 30 to about 110, alternatively about 30 to about 90, phr of reinforcing carbon black selected from at least one of:
      (1) classical carbon black having a concentration of acidic groups on its surface in a range of about 0.1 to about 2.0 ueq/m$^2$ (micro equivalents/cm$^2$) wherein said acidic groups are comprised of at least one of carboxyl and hydroxyl groups; and wherein said classical carbon black has a Nitrogen Specific Surface Area (N$_2$SA) in a range of about 30 to about 250 g/m$^2$ (ASTM D3037) and a corresponding DBP Adsorption Number in range of about 20 to about 150 cm$^3$/100 g;
      (2) alkoxysilane modified reinforcing carbon black as a carbon black treated with an alkoxysilane having the general formula (R'O)$_{4-x-y}$Si(R)$_x$(OH)$_y$ including R$_n$(R'O)$_m$Si and (R'O)$_n$Si(OH)$_m$ where R and R' are individually selected from the group consisting of primary, secondary and tertiary alkyl radicals and aralkyl radicals where R has from 1 to 20 carbon atoms and R' has from 1 to 3 carbon atoms; n and m are whole integers from 1 to 3 such that the sum of n and m is 4, x is zero or an integer from 1 to 4 and y is zero or an integer of from 1 to 4; and
      (3) a modified classical carbon black having been modified by being partially oxidized to increase its concentration of acidic groups on its surface by at least 30 percent to a concentration in a range of about 0.2 to about 5.0 ueq/m$^2$; wherein said acidic groups are comprised of at least one of carboxyl and hydroxyl groups; and wherein said modified classical carbon black has a Nitrogen Specific Surface Area (N$_2$SA) in a range of about 30 to about 250 g/m$^2$ (ASTM D3037) and a corresponding DBP Adsorption Number in a range of about 20 to about 150 cm$^3$/100 g; and
   (C) at least one coupling agent selected from materials having the following formula(s):

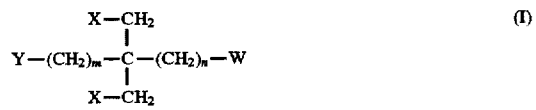

(I)

wherein X is a radical selected from at least one of hydroxyl, amine and carboxyl radicals; Y is a radical selected from hydroxyl and hydrogen radicals; W is a radical selected from hydroxyl, thiol, cyanide, epoxide, allyl, vinyl, dithiocarbamate and benzothiazole radicals; m is zero or one; and n is an integer of 1 to 6, inclusive;

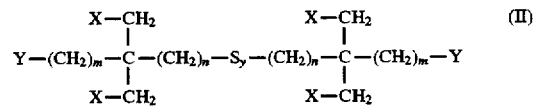

(II)

wherein X is a radical selected from at least one of hydroxyl, amine and carboxyl radicals; Y is a radical selected from hydroxyl or hydrogen radicals; m is zero or one; n is an integer of 1, 2 or 3 and y is an integer of 1 to 6 inclusive, provided however that where y is 1 or 2, then at least an amount of free sulfur equivalent to the amount of sulfur contained in the formula (II) is added to the rubber composition;

(III)

where X is a radical selected from hydroxyl, amine and carboxyl radicals; W is a radical selected from hydroxyl, thiol, cyanide, epoxide, allyl, vinyl, dithiocarbamate and benzothiazole radicals; a is an integer of 1 to 4 inclusive; and c is zero or an integer of from 1 to 3 inclusive;

wherein X is a radical selected from hydroxyl, amine and carboxyl radicals; a is an integer of 1 to 3 inclusive; c is zero or an integer of from 1 to 3 inclusive; and y is an integer of 1 to 6 inclusive, provided however that where y is 1 or 2, then at least an amount of free sulfur equivalent to the amount of sulfur contained in the formula (IV) is added to the rubber composition;

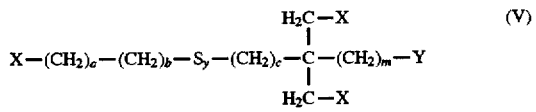

wherein X is a radical selected from hydroxyl, amine and carboxyl radicals; Y is a radical selected from hydroxyl and hydrogen radicals; m is zero or 1; a is an integer from 1 to 5 inclusive; c is zero or an integer from 1 to 3 inclusive; and y is an integer of 1 to 6 inclusive, provided however that where y is 1 or 2, then at least an amount of free sulfur equivalent to the amount of sulfur contained in the formula (V) is added to the rubber composition;

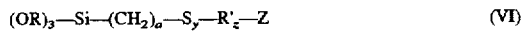

wherein R is an alkyl radical selected from methyl, ethyl and propyl, preferably from methyl and ethyl, radicals; z is zero or one and y is an integer of 1 to 6 inclusive, provided however that where y is 1 or 2, then at least an amount of free sulfur equivalent to the amount of sulfur contained in the formula (V) is added to the rubber composition; R' is an alkylene radical containing from 1 to 15 carbon atoms; and Z is selected from one of the following radicals:

wherein R is an alkyl radical selected from at least one of methyl, ethyl, propyl and butyl radicals.

2. The rubber composition of claim 1 wherein said carbon black is said classical carbon black and said coupling agent is said coupling agent Formula I.

3. The rubber composition of claim 1 wherein said carbon black is said classical carbon black and said coupling agent is said coupling agent Formula II.

4. The rubber composition of claim 1 wherein said carbon black is said classical carbon black and said coupling agent is said coupling agent Formula III.

5. The rubber composition of claim 1 wherein said carbon black is said classical carbon black and said coupling agent is said coupling agent Formula IV.

6. The rubber composition of claim 1 wherein said carbon black is said classical carbon black and said coupling agent is said coupling agent Formula V.

7. The rubber composition of claim 1 wherein said carbon black is said classical carbon black and said coupling agent is said coupling agent Formula VI-A.

8. The rubber composition of claim 1 wherein said carbon black is said classical carbon black and said coupling agent is said coupling agent Formula VI-B.

9. The rubber composition of claim 1 wherein said carbon black is said alkoxysilane modified carbon black and said coupling agent is said coupling agent Formula I.

10. The rubber composition of claim 1 wherein said carbon black is said alkoxysilane modified carbon black and said coupling agent is said coupling agent Formula II.

11. The rubber composition of claim 1 wherein said carbon black is said alkoxysilane modified carbon black and said coupling agent is said coupling agent Formula III.

12. The rubber composition of claim 1 wherein said carbon black is said alkoxysilane modified carbon black and said coupling agent is said coupling agent Formula IV.

13. The rubber composition of claim 1 wherein said carbon black is said alkoxysilane modified carbon black and said coupling agent is said coupling agent Formula V.

14. The rubber composition of claim 1 wherein said carbon black is said alkoxysilane modified carbon black and said coupling agent is said coupling agent Formula VI-A.

15. The rubber composition of claim 1 wherein said carbon black is said alkoxysilane modified carbon black and said coupling agent is said coupling agent Formula VI-B.

16. The rubber composition of claim 1 wherein said carbon black is said partially oxidized carbon black and said coupling agent is said coupling agent Formula I.

17. The rubber composition of claim 1 wherein said carbon black is said partially oxidized carbon black and said coupling agent is said coupling agent Formula II.

18. The rubber composition of claim 1 wherein said carbon black is said partially oxidized carbon black and said coupling agent is said coupling agent Formula III.

19. The rubber composition of claim 1 wherein said carbon black is said partially oxidized carbon black and said coupling agent is said coupling agent Formula IV.

20. The rubber composition of claim 1 wherein said carbon black is said partially oxidized carbon black and said coupling agent is said coupling agent Formula V.

21. The rubber composition of claim 1 wherein said carbon black is said partially oxidized carbon black and said coupling agent is said coupling agent Formula VI-A.

22. The rubber composition of claim 1 wherein said carbon black is said partially oxidized carbon black and said coupling agent is said coupling agent Formula VI-B.

23. The rubber composition of claim 1 wherein said carbon black is said classical carbon black and the coupling agent is selected from one of 1,1-di(hydroxymethyl)-1,3-propane diol, 3,3,3-tri(hydroxymethyl)-1-propanol and 3,3-di (hydroxymethyl)-1-propanol; 2-(3-{[3,4-dihydroxy-3-(hydroxymethyl)butyl]disulfanyl}ethyl)-1,2,3 propane triol-1,3-propane diol, 2-(2-{[4-hydroxy-3-(hydroxymethyl) butyl]disulfanyl}ethyl)-1,3-propane diol, and 2-(2{4-hydroxy-3,3-di(hydroxymethyl)butyl]disulfanyl}ethyl)-2-(hydroxymethyl)-1,3-propane diol; 1,4-butane diol; bis-(1-hydroxy-2-sulfanyl-ethane); bis-(1-hydroxy-2-sulfanyl-ethane); 2-[2-[(2-hydroxyethyl) disulfanyl]ethyl}-2-(hydroxymethyl)-1,3-propane diol; diethyl{4'-[1,1,1 triethoxysilyl)propyl]tetrasulfanyl} thiophosphate and (triethoxysilyl-propyl) tetra sulfanylphosphate.

24. The rubber composition of claim 1 wherein said carbon black is said alkoxysilane modified carbon black and the coupling agent is selected from one of 1,1-di (hydroxymethyl)-1,3-propane diol, 3,3,3-tri (hydroxymethyl)-1-propanol and 3,3-di (hydroxymethyl)-1- propanol; 2-(3-{[3,4-dihydroxy-3-(hydroxymethyl)butyl] disulfanyl}ethyl)-1,2,3 propane triol-1,3-propane diol, 2-(2-{[4'-hydroxy-3-(hydroxymethyl)butyl]disulfanyl}ethyl)-1, 3-propane diol, and 2-(2{4-hydroxy-3,3-di(hydroxymethyl) butyl]disulfanyl}ethyl)-2-(hydroxymethyl)-1,3-propane diol; 1,4-butane diol; bis-(1-hydroxy-2-sulfanyl-ethane); bis-(1-hydroxy-2-sulfanyl-ethane); 2-[2-[(2-hydroxyethyl) disulfanyl]ethyl}-2-(hydroxymethyl)-1,3-propane diol; diethyl {4'-[1,1,1 triethoxysilyl)propyl]tetrasulfanyl} thiophosphate and (tri-ethoxysilyl-propyl) tetra sulfanylphosphate.

25. The rubber composition of claim 1 wherein said carbon black is said partially oxidized carbon black and the coupling agent is selected from one of 1,1-di (hydroxymethyl)-1,3-propane diol, 3,3,3-tri (hydroxymethyl)-1-propanol and 3,3-di (hydroxymethyl)-1-propanol; 2-(3-{[3,4-dihydroxy-3-(hydroxymethyl)butyl] disulfanyl}ethyl)-1,2,3 propane triol-1,3-propane diol, 2-(2-{[4'-hydroxy-3-(hydroxymethyl)butyl] disulfanyl}ethyl) -1,3-propane diol, and 2-(2{4-hydroxy-3,3-di (hydroxymethyl)butyl]disulfanyl}ethyl)-2-(hydroxymethyl) -1,3-propane diol; 1,4-butane diol; bis-(1-hydroxy-2-sulfanyl-ethane); bis-(1-hydroxy-2-sulfanyl-ethane); 2-[2-[(2-hydroxyethyl) disulfanyl]ethyl}-2-(hydroxymethyl)-1,3-propane diol; diethyl{4'-[1,1,1 triethoxysilyl)propyl] tetrasulfanyl} thiophosphate and (tri-ethoxysilyl-propyl) tetra sulfanylphosphate.

26. The rubber composition of claim 1 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

27. The rubber composition of claim 9 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

28. The rubber composition of claim 10 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

29. The rubber composition of claim 11 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

30. The rubber composition of claim 12 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

31. The rubber composition of claim 13 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

32. The rubber composition of claim 14 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

33. The rubber composition of claim 15 wherein said carbon black is a carbon black having been treated with at least one alkoxysilane selected from n-octyl triethoxysilane, n-hexadecyl triethoxysilane, dimethyl diethoxysilane, n-octadecyl trimethoxysilane, n-octadecyl triethoxysilane, methyl n-octyl diethoxysilane, trimethoxysilanole, triphenoxysilanole, dimethoxy-dipropyl-silane and tetra-ethoxysilane.

34. The rubber composition of claim 1 which also contains precipitated silica in an amount of about 10 to about 100 phr and the total of said carbon black and precipitated silica is within a range of about 40 to about 110 phr.

35. The rubber composition of claim 1 which also contains precipitated silica in an amount of about 10 to about 100 phr, the total of said carbon black and precipitated silica is within a range of about 40 to about 110 phr and wherein said carbon black is said polysiloxane modified carbon black.

36. The rubber composition of claim 1 wherein the weight ratio of said coupling agent to said carbon black is within a range of about 0.01 to about 0.25.

37. The rubber composition of claim 1 wherein the weight ratio of said coupling agent to said carbon black and said precipitated silica is within a range of about 0.01 to about 0.25.

38. The rubber composition of claim 1 wherein, for said coupler of coupler Formulas II, IV, V and VI, y is from 1 to about 2 inclusive and free sulfur, in addition to sulfur added as a curative for the rubber composition is added in an amount of about equal to the amount of sulfur contained in the respective Formula.

39. The rubber composition of claim 1 where in said alkoxysilane for modifying the carbon black R is an alkyl radical having from 1 to 20 carbon atoms wherein at least one R has from 6 to 20 carbon atoms and the remainder of the R radicals, if any, contain from 1 to 3 carbon atoms inclusive.

40. The rubber composition of claim 1 wherein said diene based elastomer(s) is selected from homopolymers and copolymers of conjugated dienes and copolymers of conjugated diene(s) and vinyl aromatic compound.

41. The rubber composition of claim 40 wherein said diene is selected from isoprene and 1,3-butadiene and such vinyl aromatic compound is selected from styrene and alpha-methystyrene.

42. The rubber composition of claim 40 wherein said diene based elastomer(s) is selected from at least one of cis 1,4-polyisoprene rubber (natural and/or synthetic), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), high vinyl polybutadiene rubber having from about 35 to about 90 percent vinyl 1,2- content and emulsion polymerization prepared butadiene/acrylonitrile copolymers.

43. A tire having a tread of the rubber composition of claim 1.
44. A tire having a tread of the rubber composition of claim 2.
45. A tire having a tread of the rubber composition of claim 3.
46. A tire having a tread of the rubber composition of claim 4.
47. A tire having a tread of the rubber composition of claim 5.
48. A tire having a tread of the rubber composition of claim 6.
49. A tire having a tread of the rubber composition of claim 7.
50. A tire having a tread of the rubber composition of claim 8.
51. A tire having a tread of the rubber composition of claim 9.
52. A tire having a tread of the rubber composition of claim 10.
53. A tire having a tread of the rubber composition of claim 11.
54. A tire having a tread of the rubber composition of claim 12.
55. A tire having a tread of the rubber composition of claim 13.
56. A tire having a tread of the rubber composition of claim 14.
57. A tire having a tread of the rubber composition of claim 15.
58. A tire having a tread of the rubber composition of claim 16.
59. A tire having a tread of the rubber composition of claim 17.
60. A tire having a tread of the rubber composition of claim 18.
61. A tire having a tread of the rubber composition of claim 19.
62. A tire having a tread of the rubber composition of claim 20.
63. A tire having a tread of the rubber composition of claim 21.
64. A tire having a tread of the rubber composition of claim 22.
65. A tire having a tread of the rubber composition of claim 23.
66. A tire having a tread of the rubber composition of claim 24.
67. A tire having a tread of the rubber composition of claim 25.
68. A tire having a tread of the rubber composition of claim 26.
69. A tire having a tread of the rubber composition of claim 27.
70. A tire having a tread of the rubber composition of claim 28.
71. A tire having a tread of the rubber composition of claim 29.
72. A tire having a tread of the rubber composition of claim 30.
73. A tire having a tread of the rubber composition of claim 31.
74. A tire having a tread of the rubber composition of claim 32.
75. A tire having a tread of the rubber composition of claim 33.
76. A tire having a tread of the rubber composition of claim 34.
77. A tire having a tread of the rubber composition of claim 35.
78. A tire having a tread of the rubber composition of claim 36.
79. A tire having a tread of the rubber composition of claim 37.
80. A tire having a tread of the rubber composition of claim 38.
81. A tire having a tread of the rubber composition of claim 39.
82. A tire having a tread of the rubber composition of claim 40.
83. A tire having a tread of the rubber composition of claim 41.
84. A tire having a tread of the rubber composition of claim 42.

* * * * *